Figure 1:
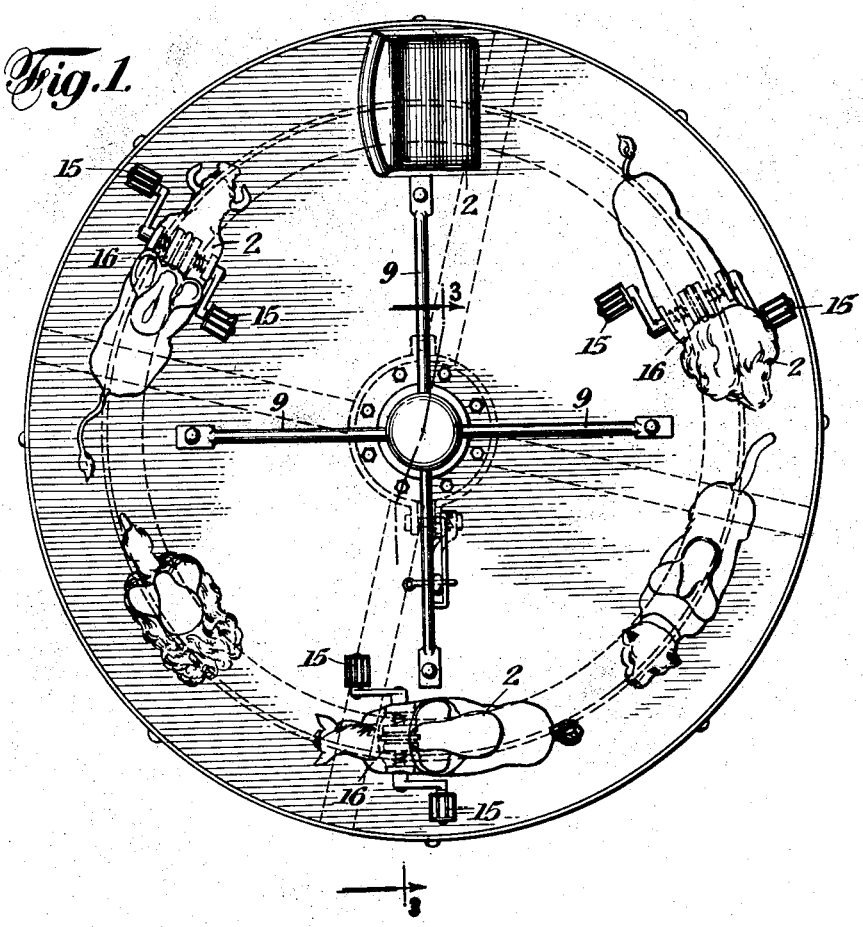

Nov. 14, 1933.    A. B. ANTONSEN    1,935,040

MERRY-GO-ROUND

Filed June 16, 1932    2 Sheets-Sheet 1

INVENTOR
Adolph B. Antonsen
BY
ATTORNEYs

Nov. 14, 1933.　　A. B. ANTONSEN　　1,935,040
MERRY-GO-ROUND
Filed June 16, 1932　　2 Sheets-Sheet 2
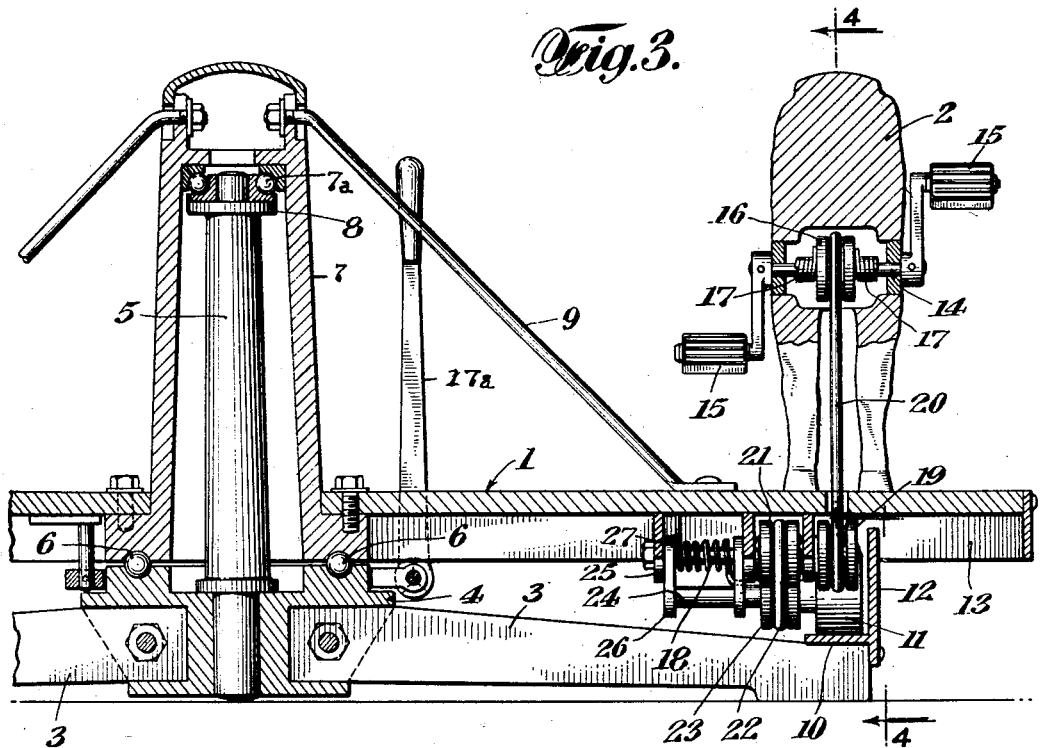
Fig. 3.
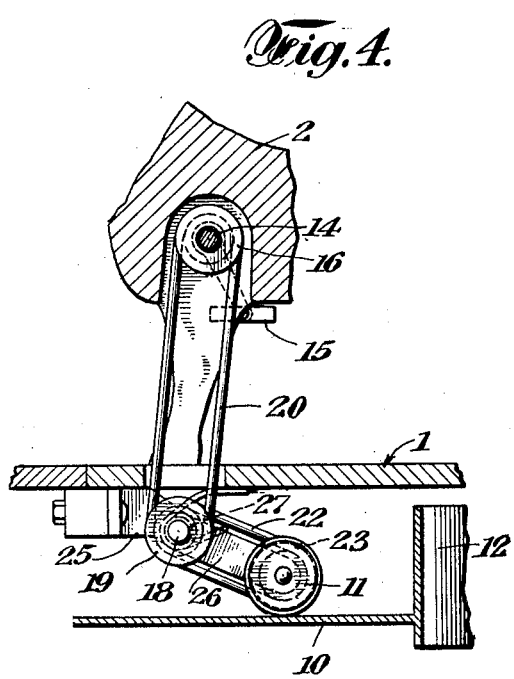
Fig. 4.
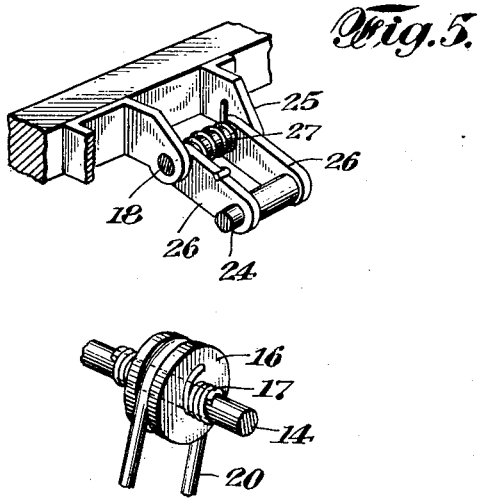
Fig. 5.
Fig. 6.
INVENTOR
Adolph B. Antonsen
BY
his ATTORNEYS Patented Nov. 14, 1933

1,935,040

UNITED STATES PATENT OFFICE 1,935,040

MERRY-GO-ROUND

Adolph B. Antonsen, Valley Stream, N. Y.

Application June 16, 1932. Serial No. 617,556

4 Claims. (Cl. 272—33)

This invention relates to a merry-go-round and particularly one to be operated out-of-doors by an occupant, such as a child, seated thereon.

In accordance with my invention I have found it important to provide a simple rugged construction which will withstand weathering and which can be built and sold at a small cost. Furthermore since the device is particularly suited to children, it is important that it contain no driving mechanism or other parts in which hands or feet can be caught and injured.

The principal object of this invention accordingly is to provide such a device embodying the characteristics just mentioned.

The invention accordingly comprises the novel apparatus and combinations thereof, specific embodiments of which are described herein by way of example only and in accordance with the manner in which I now prefer to practice the invention.

Further and more specific objects, features and advantages will clearly appear from the detailed description given below taken in connection with the accompanying drawings which form a part of this specification.

Figure 2:
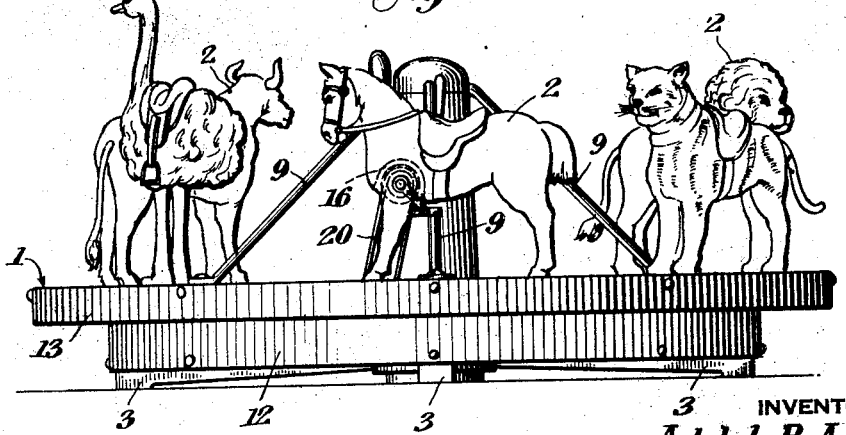

In the drawings:

Fig. 1 is a plan view of an apparatus embodying the invention; Fig. 2 is a side elevation thereof; Fig. 3 is a cross-sectional view on the line 3—3 of Fig. 1; Fig. 4 is a fragmentary detail view showing a driving mechanism taken on the line 4—4 of Fig. 3; Fig. 5 is a fragmentary detail view showing the spring-held support for the friction-drive; and Fig. 6 is a detail view showing a spring-held drive for the pedals, used to propel the rotating platform of the device.

Referring now more particularly to these drawings, the numeral 1 designates a rotatable platform provided with a series of seats 2 spaced about the platform in the usual manner. The platform is centrally supported for rotation on a series of radially disposed legs or spokes 3 (see Fig. 3) bolted to a central hub 4. A centrally upright post 5 is mounted in the hub and projects upwardly through a central aperture in the platform 1. The platform is supported by a circular ball race 6 located in the upper surface of the hub 4. An elongated tubular housing 7 surrounds the upright 5, projecting through the aperture in the platform 1, to which it is secured by bolts passing through a flange at the base of the housing. On the base of the flange is the upper part of the circular ball race 6. Another ball race 7a is situated at the top of the support 5, being supported by a collar 8 thereon, the lower half of the support for the balls being positioned on the collar, the upper half being held by the housing 7. The housing is suitably braced by braces 9 attached at one end thereto, the other end being attached to the platform 1.

At the outer extremity of the spokes 3 is a flanged metal circular track 10 for friction wheels 11, adjustably held in contact therewith and driven by the rider to rotate the platform. There is one such wheel and driving mechanism therefor associated with each of three mounts in the embodiment as shown in Figs. 1 and 2. The upright projecting flange 12 of the track preferably projects to a point near the under surface of the rotatable platform 1. There is also a downwardly projecting metal band 13 on the edge of the platform 1.

In Figs. 3 and 4 is shown one of the mechanisms for driving the friction-wheel 11. The description of one of these mechanisms will suffice for all, and it is to be understood that I may employ more or less than the number shown in Fig. 1. Mount 2 is provided with a rotatable driving shaft 14, on each extremity of which is a pedal 15 mounted at the usual 180° angle. Mounted on this shaft 14 and about centrally thereof, is a driving belt pulley 16. Coil springs 17 attached to the opposite flat faces of the pulley and coiled about the shaft 14 with the outer end of the spring free serve to attach the pulley to the shaft 14, when the pedals are being rotated forwardly. When the pedals rotate forwardly the spring 17 tends to grip the shaft tight. If a child should accidentally come in contact with a freely rotating pedal, while the merry-go-round was being driven by others, such contact would tend to rotate the pedal in the opposite direction and under those circumstances the free end of the spring would uncoil and the pedal and its shaft 14 would not rotate while the child remained in contact with the pedal, in spite of the rotation of the pulley 16. This is an additional safety device which is preferably used. If used the merry-go-round cannot be back-pedalled to stop it. In order to stop the merry-go-round under these circumstances or even if back-pedalling is possible, where such a device is not employed, I may provide a brake 17a acting on the hub 4 or elsewhere on the apparatus to arrest its motion.

Under the platform is mounted a driven shaft 18, which is aligned with the driving shaft 14. On the driving shaft is a driven belt pulley 19 aligned with pulley 16 and between the two passes a belt 20. The motion of the pulley 16 is transmitted to pulley 19. Mounted on this same shaft alongside of pulley 19 is a belt pulley 21 constituting a second driving pulley which drives through a belt 22. A second driving pulley 23 is mounted on friction-wheel shaft 24. Mounted on the friction-wheel shaft 24 alongside pulley 23 and driven thereby is the friction-wheel 11. As shown more clearly in Fig. 5, shaft 18 is supported by brackets 25 attached to the platform 1. The shaft 18 in turn supports a frame 26 in which the friction-wheel shaft 24 is mounted. This frame 26 is resiliently held by a coil-spring 27 wrapped around the shaft 18. The friction-wheel 11 being mounted on shaft 24 swings with the frame 26 under control of the spring 27. The spring is arranged so that the friction-wheel 11 will tend to bear downwardly and swing in a clockwise direction as viewed from the left in Fig. 5, whereby the friction-wheel 11 will tend to make tight contact with the track 10. I consider the friction driving mechanism an important feature of my device. It is simple in construction and since it does not involve gearing, the pulleys can be made of wood, if desired. The friction-wheel 11 preferably has a tire of rubber. With a friction drive of this type it is not necessary to adjust the position of the moving platform to the fixed track with any great precision as would be the case if gears or other fixed driving mechanism were employed. In my device the platform and track can be assembled without any particular precision with the assurance that the friction-drive will always contact properly with the track for rotating the platform since the spring 27 will keep the friction-wheel moved downwardly into proper contact with the track. In case the platform or other parts become warped due to being left out in the weather, the friction-drive will also compensate for this and continue to function properly.

It will be seen that the device described achieves the objects mentioned. It is rugged and simple in construction. Most of the parts may be made of wood and, therefore, the device can be inexpensively built. I prefer to make the device so that the platform is about one foot from the ground so that in case young children use it and should fall off they would not be apt to be seriously injured. The friction-drive mechanism has all of its parts out of reach of hands or feet except the belts which run down between the legs of the animals. These belts are preferably of rubber and offer substantially no danger to even a small child. For some reasons it may be desirable to eliminate the upright flange 12 of the track 10 in order to make the drive mechanism more accessible for oiling and repairs. Even if this is eliminated, the device is still safe for children since the platform is so close to the ground that a child would have difficulty in getting under the platform, and even if it should by chance put its hand on the track, the friction-wheel being spring-held would tend to lift over the hand rather than to injure it.

The operation of the device will be clear from the description given. Briefly one or several children seat themselves on the mounts provided with pedals to operate the device. Other smaller children may seat themselves on the mounts without pedals. The pedals are rotated by the feet and operate through the driving mechanism to rotate the friction-wheel 11 which by contact with the track rotates the platform.

While I have described my invention in great detail and with respect to a preferred embodiment thereof, I do not desire to be limited to such details or forms since many changes and modifications may be made and the invention embodied in widely different forms without departing from the spirit and scope thereof in its broader aspects. Hence I desire to cover all forms coming within the language or scope of any one or more of the appended claims.

What I claim as new and desire to secure by Letters Patent, is:

1. In an occupant-operated merry-go-round in combination, a rotatable platform with seats thereon, a track thereunder, a friction wheel on said track, a resiliently-held member attached to the platform having a portion free to oscillate between the platform and track, said wheel being supported on the free portion of said member, an operating device for at least one of said seats, and connections therewith for driving said wheel.

2. In an occupant-operated merry-go-round in combination, a rotatable centrally supported platform with seats thereon, a track mounted below said platform, and an adjustable friction-drive provided with a friction-wheel spring-held against said track for rotating the platform, including pedals to be operated from one or more seats, a belt driven by each set of pedals, a second belt driven by the first belt, driving said friction-wheel.

3. An apparatus according to claim 2 in which the pedals are connected to the first belt by a device driving the belt only in one direction.

4. In an occupant-operated merry-go-round in combination, a centrally supported rotating platform with seats thereon, a circular track thereunder for the friction driving mechanism, a friction-drive for rotating the platform associated with one or more of the seats, each friction-drive including a driving shaft to be operated by pedals from the seat, a driving belt operated by said shaft, a rotatable driving shaft under the platform, a driven belt pulley thereon, a second driving pulley operated by said driven pulley and a friction-wheel operated by said second driving pulley, said friction-wheel being mounted in a spring-held frame so that the wheel is pressed downwardly against the circular track, whereby upon rotating the pedals the platform is rotated by friction of the wheel against the track.

ADOLPH B. ANTONSEN.